US012778018B2

(12) United States Patent
Höller

(10) Patent No.: US 12,778,018 B2
(45) Date of Patent: Nov. 3, 2026

(54) CROP LIFTER FOR A MOWING UNIT OF A HARVESTING MACHINE

(71) Applicant: SMF—HOLDING GMBH, Eichelhardt (DE)

(72) Inventor: Frank Höller, Stein Wingert (DE)

(73) Assignee: SMF—HOLDING GMBH, Eichelhardt (DE)

( * ) Notice: Subject to any disclaimer, the term of this patent is extended or adjusted under 35 U.S.C. 154(b) by 336 days.

(21) Appl. No.: 18/573,772

(22) PCT Filed: Jun. 23, 2022

(86) PCT No.: PCT/EP2022/067172
§ 371 (c)(1),
(2) Date: Dec. 22, 2023

(87) PCT Pub. No.: WO2022/268950
PCT Pub. Date: Dec. 29, 2022

(65) Prior Publication Data

US 2024/0306547 A1 Sep. 19, 2024

(30) Foreign Application Priority Data

Jun. 23, 2021 (EP) .................................... 21181120

(51) Int. Cl.
*A01D 65/02* (2006.01)

(52) U.S. Cl.
CPC .................................... *A01D 65/02* (2013.01)

(58) Field of Classification Search
CPC ......... A01D 65/02; A01D 25/00; A01D 34/24
USPC ................... 56/312, 313, 298, 305, 307, 119
See application file for complete search history.

(56) References Cited

U.S. PATENT DOCUMENTS 661,216 A * 11/1900 Johnson ................. A01D 65/02 56/312
728,561 A * 5/1903 Franzmeier ............ A01D 65/02 56/313
1,202,084 A 10/1916 Merkel
1,818,335 A * 8/1931 Kenison ................. A01D 65/02 56/312

(Continued)

FOREIGN PATENT DOCUMENTS

CN 105307474 A * 2/2016 ............. A01D 65/00
DE 3516554 A1 * 5/1985

(Continued)

OTHER PUBLICATIONS

International Search Report for PCT/EP2022/067172 dated Sep. 6, 2022.
Written Opinion for PCT/EP2022/067172 dated Sep. 6, 2022.

*Primary Examiner* — Christopher J Sebesta
*Assistant Examiner* — Sunny D Webb
(74) *Attorney, Agent, or Firm* — Sughrue Mion, PLLC

(57) ABSTRACT

Ear lifter for a mower of a harvesting machine with finger guards attached to a cutter bar. The ear lifter has a support rail with a first end for attachment to the cutter bar, a stalk lifter connected to a second end of the support rail and a locking lever, wherein the locking lever has a support surface for support on one of the finger guards and can be fixed in at least two positions relative to the support rail in order to set a distance between the finger guard and the support rail.

14 Claims, 7 Drawing Sheets

(56) References Cited

U.S. PATENT DOCUMENTS

| | | | | | |
|---|---|---|---|---|---|
| 1,877,272 | A * | 9/1932 | Coultas | A01D 65/02 56/313 |
| 2,141,299 | A * | 12/1938 | Hume | A01D 65/02 56/313 |
| 2,892,298 | A * | 6/1959 | Chaney | A01D 65/02 56/314 |
| 3,313,095 | A * | 4/1967 | Gaterman | A01D 34/14 56/312 |
| 3,579,967 | A * | 5/1971 | Schumacher | A01D 65/00 56/313 |
| 4,887,419 | A * | 12/1989 | Bouin | A01D 65/02 56/319 |
| 6,442,919 | B1 * | 9/2002 | Schumacher | A01D 65/02 56/307 |
| 6,442,929 | B1 | 9/2002 | Kraft et al. | |
| 6,655,120 | B2 * | 12/2003 | Schumacher | A01D 65/02 56/312 |
| 6,691,499 | B2 * | 2/2004 | Schumacher | A01D 65/02 56/312 |
| 8,112,979 | B2 * | 2/2012 | Schumacher | A01D 65/02 56/313 |
| 12,268,126 | B2 * | 4/2025 | Höller | A01D 65/02 |
| 2022/0210978 | A1 * | 7/2022 | Höller | A01D 65/02 |

FOREIGN PATENT DOCUMENTS

| | | | | |
|---|---|---|---|---|
| DE | 43 23 053 | A1 | 1/1995 | |
| DE | 4323053 | C2 * | 7/1995 | A01D 65/02 |
| DE | 202005003355 | U1 * | 5/2005 | A01D 65/02 |
| EP | 1 061 791 | B1 | 12/2000 | |
| GB | 752961 | A * | 7/1956 | A01D 65/02 |

* cited by examiner

Fig. 10
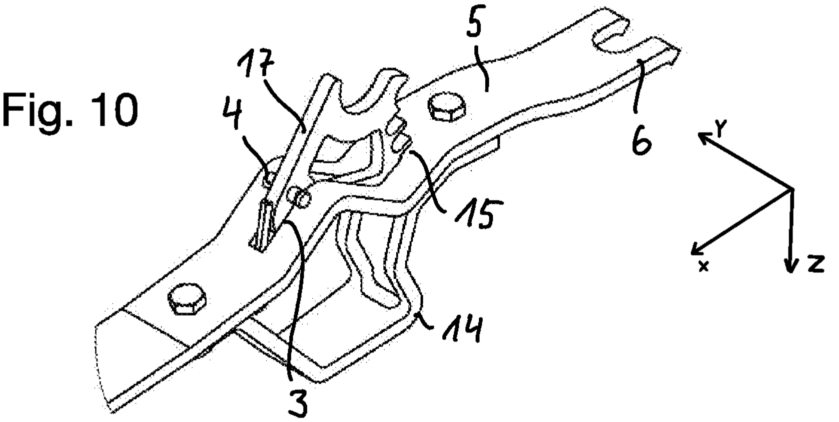
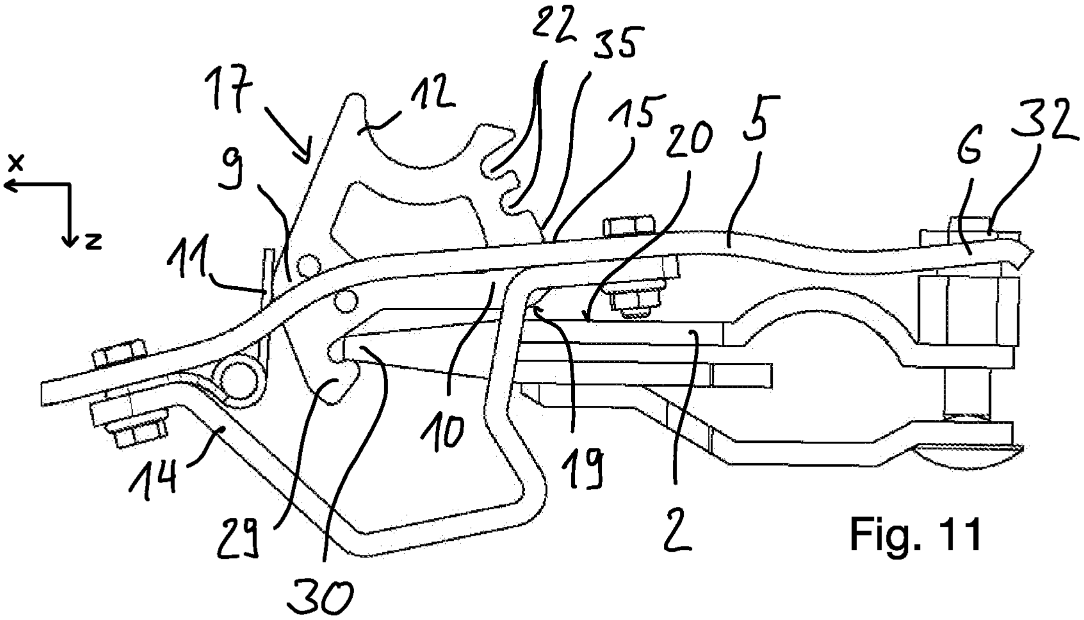
Fig. 11
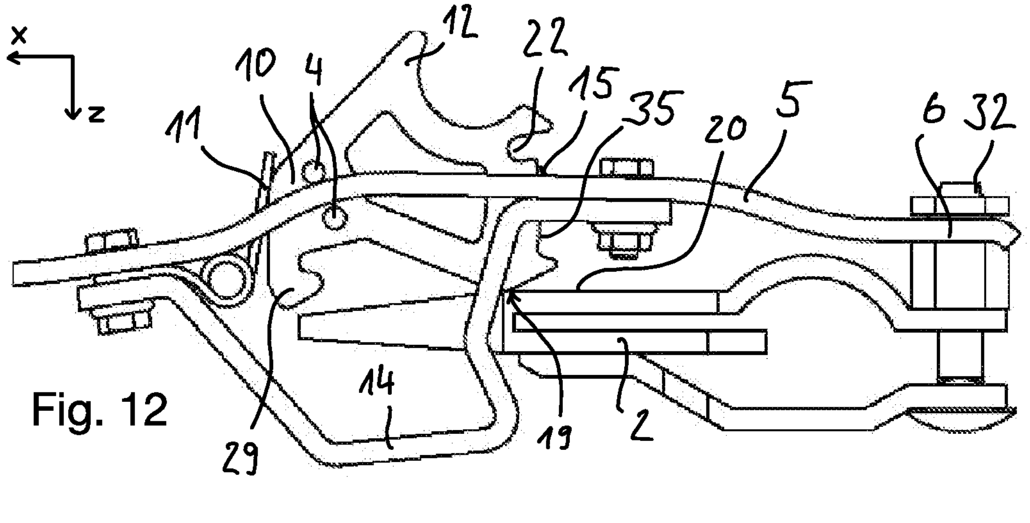
Fig. 12

Fig. 16
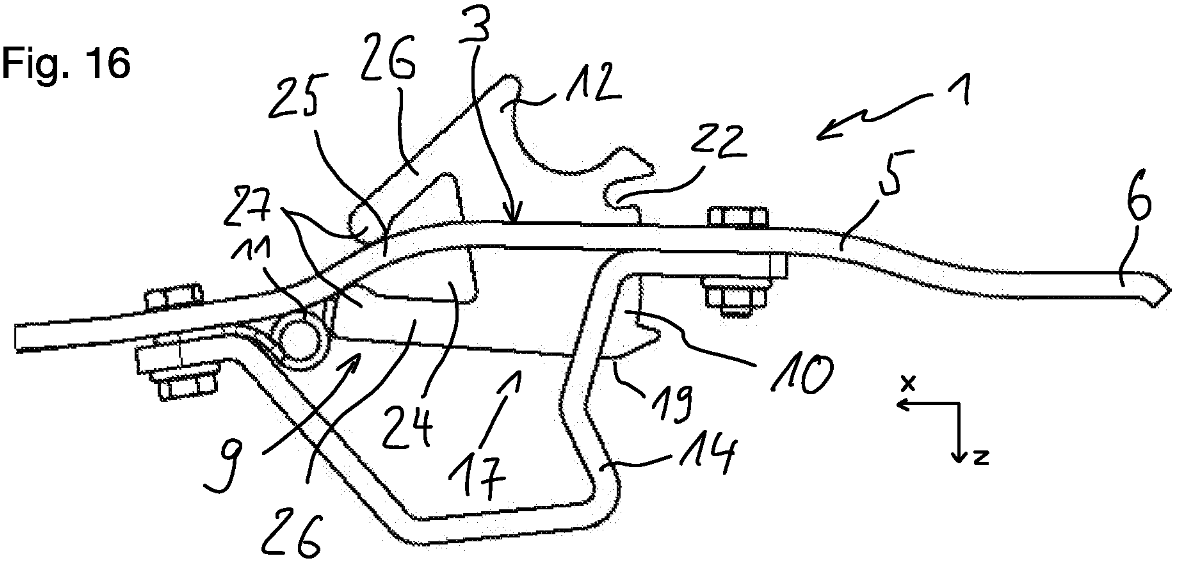
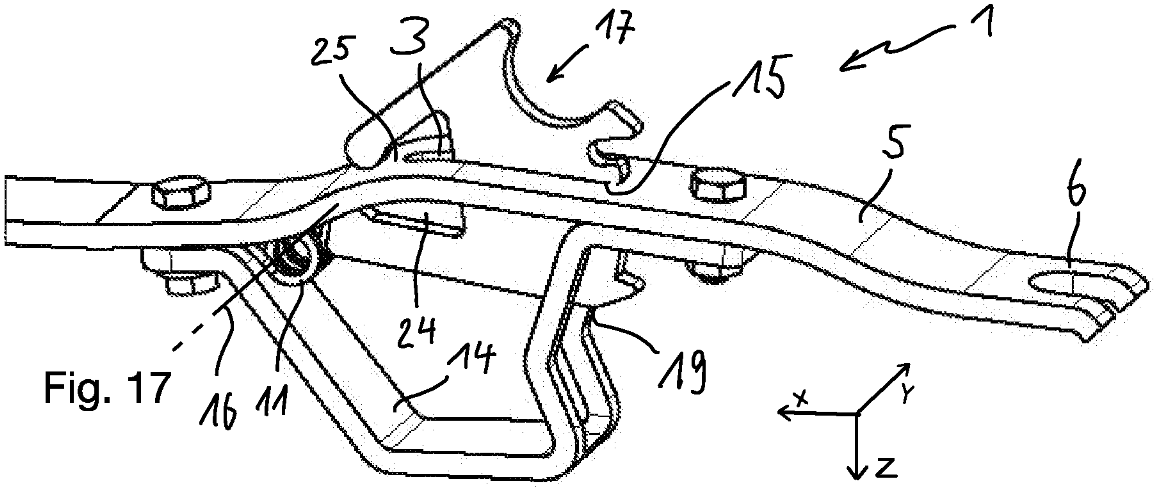
Fig. 17
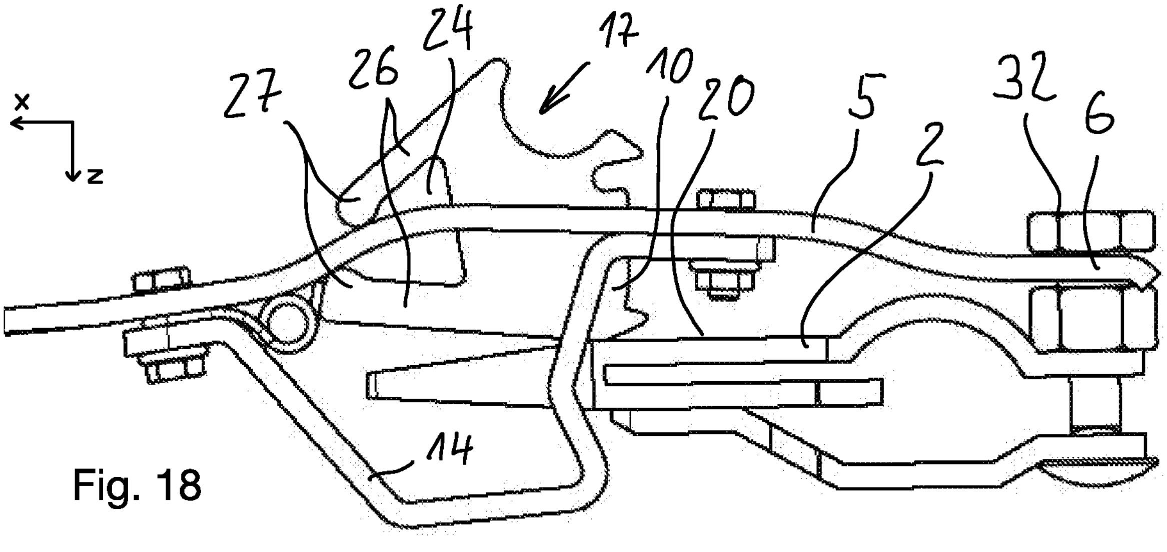
Fig. 18

CROP LIFTER FOR A MOWING UNIT OF A HARVESTING MACHINE

CROSS REFERENCE TO RELATED APPLICATION

This application is a National Stage of International Application No. PCT/EP2022/067172 filed Jun. 23, 2022, claiming priority based on European Patent Application No. 21181120.3 filed Jun. 23, 2021.

TECHNICAL FIELD

The application refers to an ear lifter for a mower of a harvesting machine with finger guards attached to a cutter bar. The ear lifter has a support rail with a first end for attachment to the cutter bar, a stalk lifter connected to a second end of the support rail and a locking lever, wherein the locking lever has a support surface for support on one of the finger guards and can be fixed in at least two positions relative to the support rail in order to set a distance between the finger guard and the support rail.

BACKGROUND ART

In mowers of this type, the finger guards are distributed along the cutter bar, which guide a knife bar and serve as the counter-blade for the cutting edges of the mower blades attached to the reciprocating knife bar. Ear lifters are used to safely mow bent or laid stalks. Different mower settings are required depending on the type or nature of the crop and the desired cutting height. As a result, the alignment of the ear lifter to the ground also changes. To ensure that the sliding area of the ear lifter is as parallel as possible to the ground, the area protruding beyond the tip of the finger guard is raised or lowered in relation to the finger guard.

For this purpose, EP 1 061 791 B1 discloses an ear lifter which has a support rail which can be connected to the cutter bar and a stalk lifter which is connected to the support rail. A holding element attached to the support rail, consisting of two spaced legs between which the tip of a finger guard can be inserted, has a locking lever which is pivotably mounted between the two legs about a pivot pin. A first lever arm with a support surface can be brought into contact with an upper side of the finger guard for support and a second lever arm has at least one latching surface. A locking element comes into contact with the locking surface of the locking lever to prevent the locking lever from moving. To move the locking lever into the desired position, the area of the ear lifter that protrudes over the tip of the finger guard can be lifted and pressed onto the second arm of the locking lever to bring it into contact with the locking element. To release it, the locking lever must be disconnected from the locking element using a tool.

SUMMARY OF INVENTION

An objective may be to propose an ear lifter whose handling is simplified, for example by enabling height adjustment and/or disassembly without tools and/or by enabling height adjustment and/or disassembly to be carried out with one hand.

The objective is accomplished by the subject of claim 1. Advantageous embodiments are given in the dependent claims.

An ear lifter for a mower of a harvesting machine with finger guards attached to a cutter bar has a support rail with a first end for attachment to the cutter bar, a stalk lifter connected to a second end of the support rail and a locking lever. The locking lever has a support surface for support on one of the finger guards and can be fixed in at least two positions relative to the support rail in order to set a distance between the finger guard and the support rail. According to an aspect, an elongate recess is provided on the ear lifter and the locking lever is displaceably guided in the elongate recess.

To set a distance between the finger guard and the support rail, a distance is set between the support surface and the support rail, wherein the at least two positions correspond to two different distances between the support surface and the support rail.

One advantage is that the locking lever can be fixed in each of the positions and released from them by moving the locking lever along the elongate recess, so that advantageously no further component needs to be actuated, in particular not with a tool.

In order to be displaceable relative to the support rail between the at least two positions, the locking lever can, for example, be held in the elongate recess so that it can pivot relative to the support rail. The elongate recess can extend along the support rail in general, wherein it does not necessarily have to extend in parallel to the support rail. The elongate recess can be formed on any component that is connected to the support rail, or on the support rail itself. The elongate recess is continuous. It extends considerably further in a longitudinal direction than in a direction transverse to the longitudinal direction, for example at least five times as further. The elongate recess can also be referred to as an elongate hole, wherein the extension transverse to the longitudinal direction does not necessarily have to be constant.

The locking lever can be designed as a plate, which can also be described as a plate-shaped or flat component. A plate is characterized by the fact that it has a significantly greater extension in two of the spatial directions than in the third spatial direction, for example at least five times an extension. The locking lever can be punched or cut out of a flat material such as sheet metal. A thickness of the locking lever is adapted to the elongate recess in such a way that the locking lever can be arranged in the elongate recess.

According to an embodiment, the locking lever has latching recesses, one of the latching recesses in each position interacting with a latching portion on an edge region of the elongate recess in order to fix the locking lever in the respective position. The latching recesses can be arranged in steps. According to an embodiment, the latching recesses are groove-shaped in order to be able to embrace the latching portion on multiple sides.

According to a further embodiment, it is provided that the latching portion forms an acute angle with a surface of the finger guard that interacts with the locking lever. The support rail is attached to the cutter bar at the first end and is deflected to adjust the height. A tension of the support rail between the first end and a support on the surface of the finger guard via the support surface of the locking lever, which is caused by the deflection, generates a spring force of the support rail that is essentially directed in the direction of the finger guard, i.e. in the installation position directed towards the ground. This spring force is transferred to the latching recess via the latching portion. Accordingly, a proportion dependent on the angular dimension of the acute angle of the spring force acts towards the latching recess. In this way, the latching portion is held in the latching recess by the proportion of the spring force, which latching recess can advantageously extend at an angle corresponding to the acute angle. This prevents the locking lever from coming loose. The acute angle can, for example, be open towards the first end of the support rail. To provide the acute angle between the latching portion and the back of the blade, the elongate recess can have a kink in the direction of its longitudinal extension or, in particular, an S-shaped or Z-shaped course.

According to a further embodiment, the locking lever is arranged pivotably in the elongate recess, a resulting pivot axis extending transversely to a longitudinal extent of the elongate recess and being displaceable in a direction of the longitudinal extent of the elongate recess. The pivot axis within the meaning of the application is to be understood as an imaginary axis of rotation of the locking lever, which need not have any physical features in the sense of a shaft, axle or suspension. A swivel range of the locking lever may be limited, provided that it can be moved to the various positions. A swivel range of maximum 450 angular dimension can be provided.

According to a further embodiment, it is provided that the locking lever has a connecting portion and a supporting portion arranged side by side in the elongate recess, the locking lever being held at the connecting portion so as to be pivotable about the pivot axis in the elongate recess. The connecting portion and the supporting portion are therefore arranged next to each other in the direction of the longitudinal extension of the elongate recess. The connecting portion and the supporting portion are arranged at least partially within the elongate recess and protrude from it, for example. The pivot axis runs through the connecting portion, to which it is largely stationary. This is not necessarily the case with regard to the alignment with the elongate recess, as the locking lever can be held in the elongate recess with play. The supporting portion can face towards the first end of the support rail and the connecting portion can face towards the second end of the support rail. The support surface and the latching recesses can be formed on the supporting portion, wherein the latching recesses are arranged at different distances from the support surface. By pivoting the locking lever, distances between the latching recesses and the elongate recess and thus to the support rail can be advantageously changed.

The locking lever can have a recess between the connecting portion and the supporting portion, wherein the connecting portion is connected to the supporting portion via a first leg. The supporting portion can have a second leg that is angled in relation to the first leg and comprises the latching recesses. The first leg and the second leg can, for example, enclose an angle of around 90°. For example, the support surface is arranged on a side of the supporting portion facing the finger guard and the second leg is arranged on a side of the supporting portion facing away from the support surface. As a result, the distance between the support surface and the elongate recess, and therefore to the support rail, also changes as the locking lever pivots.

According to a further embodiment, it is provided that the edge region of the elongate recess forming the latching portion is arranged at a rear end of the elongate recess facing the first end of the mounting rail. The designation as rear end is defined as corresponding to the rear end in a direction of travel of the harvester when installed. The locking lever can be pretensioned in the direction of the latching portion by a tension spring.

Various embodiments can be considered for securing the locking lever in the elongate recess, which ensure that the locking lever can be mounted and that a loss of the locking lever during operation is ideally avoided.

A possible embodiment provides that the locking lever has a connecting recess, wherein the connecting recess is intended to receive a connecting edge region of the elongate recess. The connecting edge region of the elongate recess is arranged at an end of the elongate recess opposite the latching portion, for example facing the second end of the support rail, and can also be referred to as the front end of the elongate recess. The connecting recess is formed in the connecting portion of the locking lever and is delimited by webs, the ends of which accommodate the connecting edge region between them. An opening is formed between the ends, which opening is at least wide enough to accommodate the connecting edge region. The connecting recess widens behind the opening to allow the locking lever to swivel around the connecting portion. A distance between the front end and the rear end of the elongate recess is less than an extension of the locking lever in the longitudinal direction of the elongate recess. The connecting recess extends deeper into the locking lever in the direction of the latching recesses than the latching recesses. In order to be able to insert the locking lever into the elongate recess, a minimum distance from the connecting recess to an edge of the locking lever facing the first end of the support rail is less than the distance between the front end and the rear end of the elongate recess. The locking lever is pretensioned towards the latching portion, holding it in the elongate recess. The tension spring for generating the pretensioning can act on one of the ends of the webs of the connecting recess. It would also be conceivable to arrange the tension spring in the connecting recess between the front end of the elongate recess and the locking lever.

A further possible embodiment provides that the plate-shaped locking lever has two pins which protrude from at least one of the two surfaces of the locking lever in the connecting portion, i.e. in direction of the smallest extension of the locking lever. The pins can also protrude on both sides of the locking lever. By arranging one of the pins on one side of the component comprising the elongate recess and another of the pins on the opposite side, the locking lever is advantageously held pivotably and displaceably in the elongate recess. A distance between the front end and the rear end of the elongate recess is greater than an extension of the locking lever in the longitudinal direction of the elongate recess. At least one of the pins can be designed as a pin that is inserted into a hole in the locking lever. The pin can be inserted into the hole after the locking lever has been inserted into the elongate recess to provide advantageous its assembly. The pin can be screwed, pressed, soldered or welded into the hole, for example. At least one of the pins can be formed in one piece with the locking lever. This can be produced by a forming process or a primary forming process, for example by cup drawing or bending a notch. The pins do not have to be cylindrical in shape.

According to a further possible embodiment, it is provided that the elongate recess comprises an expansion extending transversely to a longitudinal extension of the recess. This allows the locking lever with two pins to be inserted into the elongate recess. This makes it possible to form both pins in one piece with the locking lever. The locking lever is held in the elongate recess by pretensioning the locking lever against the latching portion. The tension spring for generating the pretensioning can act on an edge of the connecting portion and can extend through the elongate recess.

According to a further embodiment, the locking lever has an actuating portion for manual actuation, wherein a concave shape is formed on the actuating portion for receiving a finger of an operator. The concave shape is advantageously ergonomically shaped to ensure easy and comfortable operation with the finger and opens, for example, towards the first end of the support rail. The ear lifter can be adjusted in the various positions without tools by manual operation, in general also with just one hand, by pulling the support rail upwards by hand and actuating the actuating portion with the thumb, for example, in order to engage or release one of the latching recesses on the latching portion. Unlike the connecting portion and the supporting portion, the actuating portion is arranged outside the elongate recess, on a side of the support rail facing away from the finger guard. The actuating portion is connected to the supporting portion, for example, on a side of the latching recesses facing away from the support surface. When installed, the actuating portion is thus arranged above the supporting portion and thus above the elongate recess for convenient actuation by the operator. If the locking lever has a recess between the connecting portion and the supporting portion, the actuating portion can be connected to the second leg and to the connecting portion via a third leg, resulting in an advantageously stable, closed ring shape.

According to a further embodiment, the locking lever can comprise an actuating hook for actuation by the finger guard, which is designed to embrace a tip of the finger guard in such a way that the locking lever is held on the finger guard when a distance between the finger guard and the support rail is changed and is thus automatically adjusted to one of the positions. When the support rail is deflected, the distance to the surface of the finger guard is increased. The locking lever is pivoted by the actuating hook that reaches under the tip of the finger guard. Due to the shape of the actuating hook and the ability of the locking lever to slide along the elongate recess, the actuating hook slips off the tip of the finger guard under continued deflection of the support rail. The locking lever has previously been pivoted until one of the latching recesses reaches the latching portion and, due to the pretensioning of the locking lever against the latching portion, it engages automatically.

According to a further embodiment, it is provided that the elongate recess is arranged in the support rail, for example running in a main direction of extension of the support rail. The resulting pivot axis of the locking lever is therefore arranged in the support rail and can be adjusted along the support rail. The support surface can be designed to be in contact with a side of the finger guard facing the support rail.

The main direction of extension of the support rail corresponds in Cartesian coordinates to a spatial direction X, which corresponds to the direction of travel of the harvester when the ear lifter is mounted. The support rail does not run in a straight line in the X direction, but has several bends in a Z direction, which corresponds to a vertical or direction of gravity when the ear lifter is mounted. The support rail is flat, with greater expansion in the Y direction than in the Z direction. A deflection of the support rail clamped at the first end in the Z direction therefore generates a spring force acting in the opposite direction to the deflection. According to an embodiment, the locking lever can have a stiffening effect with respect to a bending stress on the support rail in a region of the elongate recess, a stiffening effect of the locking lever being greater in a first bending direction (Z) than in a second bending direction (−Z) opposite to the first bending direction. When the ear lifter is mounted, the deflection of the support rail in the direction of gravity is therefore counteracted more strongly than against the direction of gravity. The advantage of this is that the ear lifter is less likely to penetrate the ground due to deflection in the direction of the ground, for example by a stone, which can lead to plastic deformation and destruction of the ear lifter.

A holder for the finger guard can be arranged on the support rail. A further embodiment can then be provided with the elongate recess being arranged in the holder. This design is useful for ear lifters that are attached to the cutter bar below the finger guards and in which the holder is therefore arranged on an upper side facing the finger guard.

A further aspect of the application relates to an ear lifter for a cutter bar of a harvesting machine having finger guards attached to a cutter bar, the ear lifter comprising a support rail having a first end for attachment to the cutter bar, a stalk lifter connected to a second end of the support rail, and a locking lever, wherein the locking lever has a support surface for support on one of the finger guards and is fixable in at least two positions relative to the support rail to set a distance between the finger guard and the support rail, characterized in that the support surface is intended to be in contact with a side of the finger guard facing the support rail. Particularly advantageous, the support rail of the ear lifter can be attached to the cutter bar with the first end above the finger guard. An elongate recess can be provided in the support rail of the ear lifter, wherein the locking lever is slidably guided in the elongate recess.

A further aspect of the application relates to a mowing arrangement with a finger guard and with an ear lifter according to one of the previously described aspects or embodiments thereof.

A further aspect of the application relates to a mower for a harvesting machine, comprising a cutter bar to which finger guards are attached, wherein an ear lifter is attached to the cutter bar and the ear lifter corresponds to one of the previously described aspects or embodiments thereof.

BRIEF DESCRIPTION OF DRAWINGS

Further features and advantages are explained in more detail below with reference to the accompanying drawings. In the Figures

FIG. 10 shows a perspective view of the embodiment according to FIG. 9;

FIG. 11 shows a further embodiment of the ear lifter by means of a detail in a side view;

FIG. 12 shows the embodiment according to FIG. 11, adjusted to a greater distance between the finger guard and the support rail;

FIG. 16 shows a further embodiment of the ear lifter by means of a detail in a side view;

FIG. 17 shows a perspective view of the embodiment according to FIG. 16;

FIG. 18 shows a further embodiment of the mower with the ear lifter according to FIG. 16 by means of a detail in a side view;

DESCRIPTION OF EMBODIMENTS

Figure 1:
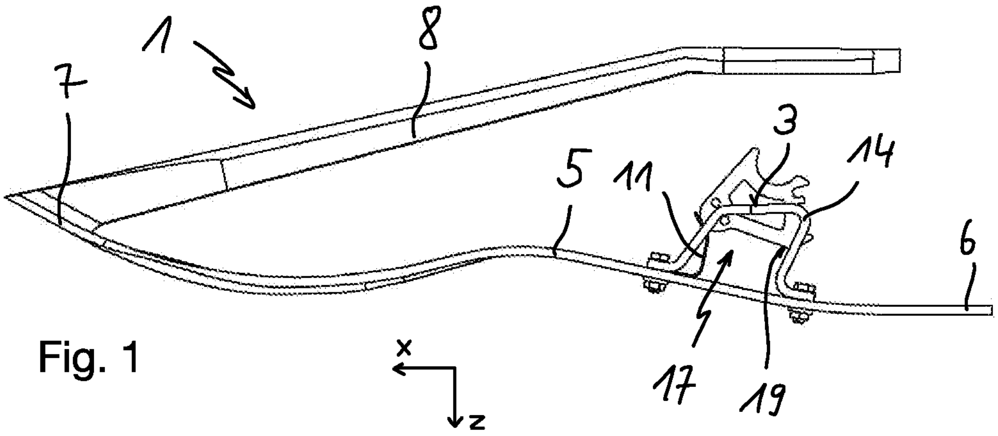
FIG. 1 shows a side view of an embodiment of an ear lifter.

FIG. 1 shows a side view of an embodiment of the ear lifter 1. A Cartesian coordinate system with three orthogonal spatial directions is represented by the arrows X and Z, which point in the X-direction and the Z-direction respectively. The third spatial direction Y corresponds to the viewing direction into the drawing plane. The Cartesian coordinate system applies to all figures and is indicated there with arrows X, Z and, if applicable, Y for perspective views. Identical reference signs in different Figures denote identical components. Recurring components with the same reference signs are not necessarily named repeatedly.

The ear lifter 1 shown in FIG. 1 for a mower of a harvesting machine is intended to be attached to a cutter bar with finger guards (not shown). A support rail 5 has a first end 6 for fastening to the cutter bar. A stalk lifter 8 is arranged at a second end 7 of the support rail 5, which is intended to lift up and mow kinked or stored stalks. A locking lever 17 with a support surface 19 for support on one of the mowing fingers can be fixed in at least two positions relative to the support rail in order to set a distance between the mowing finger and the support rail 5. The locking lever 17 can be a plate-shaped component that can be manufactured from a sheet metal plate by punching or cutting, for example. An elongate recess 3 is provided on the ear lifter 1, which in the illustrated exemplary embodiment is formed on a holder 14 for the finger guard. Details of the holder 14 and the locking lever 17 arranged in the elongate recess 3 will be exemplified by means of further Figures. The locking lever 17 is slidably guided along the elongate recess 3. A main direction of extension of the elongate recess 3 runs essentially in a plane spanned by the X-direction and the Y-direction. A spring 11 can hold the locking lever 17 in a rear position, i.e. pretension the locking lever 17 in the direction of the first end 6.

Figure 2:
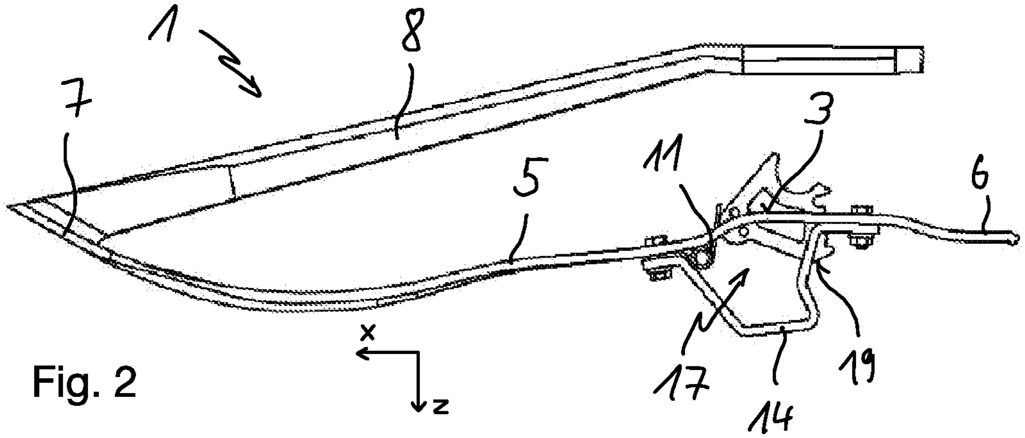
FIG. 2 shows a side view of a further embodiment of the ear lifter.

FIG. 2 shows a side view of a further embodiment of the ear lifter 1. The design of the ear lifter 1 is comparable to the design shown in FIG. 1 with regard to the arrangement of the support rail 5 and the stalk lifter 8. A difference between the embodiment shown in FIG. 2 is that the holder 14 for the finger guard (not shown) is arranged on the side of the support rail 5 facing away from the stalk lifter 8. In the installation position on the cutter bar (not shown), the holder 14 is therefore located under the support rail 5 or on the side of the support rail 5 facing the ground. In the exemplary embodiment of the ear lifter 1 shown in FIG. 2, the elongate recess 3 is formed in the support rail 5. This allows the locking lever 17 with the support surface 19 for support on the finger guard to be used to adjust the distance between the finger guard and the support rail 5 by setting the locking lever 17 in different positions relative to the support rail 5. The spring 11 pretensions the locking lever 17 against a rear end of the elongate recess 3, i.e. in the direction of the first end 6.

Figure 3:
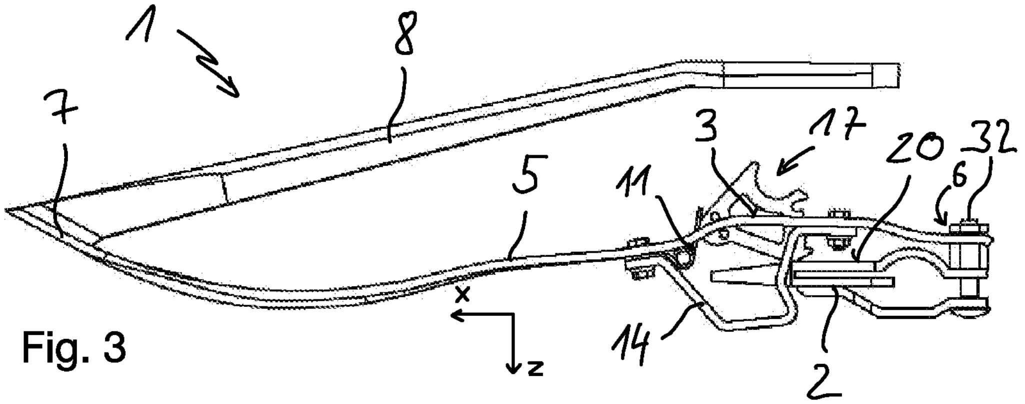
FIG. 3 shows a side view of an embodiment of a mower with the ear lifter according to FIG. 2.

FIG. 3 shows a side view of an embodiment of a mower or a mower arrangement with the ear lifter 1 as shown in FIG. 2 and the finger guard 2. The first end 6 of the support rail 5 is fixed above the finger guard 2 to a cutter bar (not shown) by fastening means 32. The illustration serves to clarify the interaction of the locking lever 17 on the ear lifter 1 with the finger guard 2. The support surface 19 (see FIG. 2) of the locking lever 17 is supported on a side 20 of the finger guard 2 facing the support rail 5. This is in the following also referred to as the upper side 20 of the finger guard 2. If the locking lever 17 is fixed in one of the at least two positions relative to the support rail 5, then the locking lever 17 forms a spacer between the support rail 5 and the finger guard 2. The support rail 5 is deflected upwards in the negative Z-direction compared to a tension-free position and thus exerts a spring force in the Z-direction, which acts on the surface 20 of the finger guard 2 via the locking lever 17. The first end 6 of the support rail 5 is attached to the cutter bar above the finger guard 2. This gives the mower more clearance in its lower section. The ear lifter 1 attached above the finger guard 2 therefore has the holder 14 on the underside of the support rail 5 facing away from the stalk lifter 8.

Figure 4:
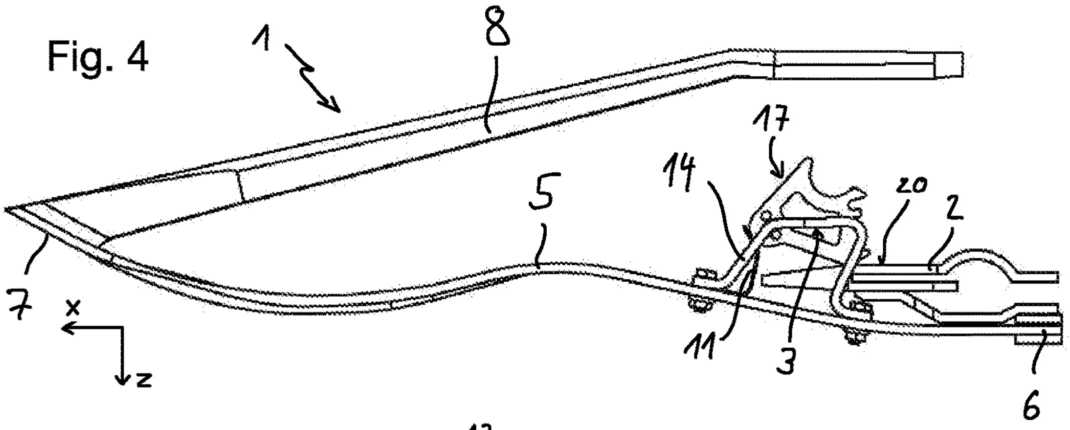
FIG. 4 shows a side view of a further embodiment of the mower with the ear lifter according to FIG. 1.

FIG. 4 shows a side view of a further embodiment of the mower or the mowing arrangement, with the ear lifter 1 as shown in FIG. 1 being attached to the cutter bar, which is not shown, together with the finger guard 2. The ear lifter 1 is arranged below the finger guard 2 so that the finger guard 2 is located between the support rail 5 and the stalk lifter 8. Accordingly, the holder 14 for the finger guard 2 is also attached to the upper side of the support rail 5 facing the stalk lifter 8. The elongate recess 3 for holding the locking lever 17 could in principle also be made in the support rail 5 in this embodiment. However, an advantageously simpler design of the locking lever 17 is made possible by the fact that the elongate recess 3 is designed in the holder 14. The support surface 19 (see FIG. 1) is supported on the upper side 20 of the finger guard 2. When the locking lever 17 is fixed in one of the at least two positions relative to the support rail 5, the locking lever 17 forms a spacer between the finger guard 2 and the support rail 5. The locking lever 17 is fixed to the holder 14, which is firmly connected to the support rail 5. The spring force of the deflected support rail 5 acting in the Z direction thus acts on the finger guard 2 via the holder 14 and the locking lever 17.

The two embodiments of the ear lifter 1 according to FIGS. 1 and 2 can be described as basic embodiments, which are jointly characterized by the fact that the support surface 19 is intended to be in contact or to be brought into contact with the side 20 of the finger guard 2 facing the support rail 5. Further details of the basic embodiments are explained below by means of further illustrations.

Figure 5:
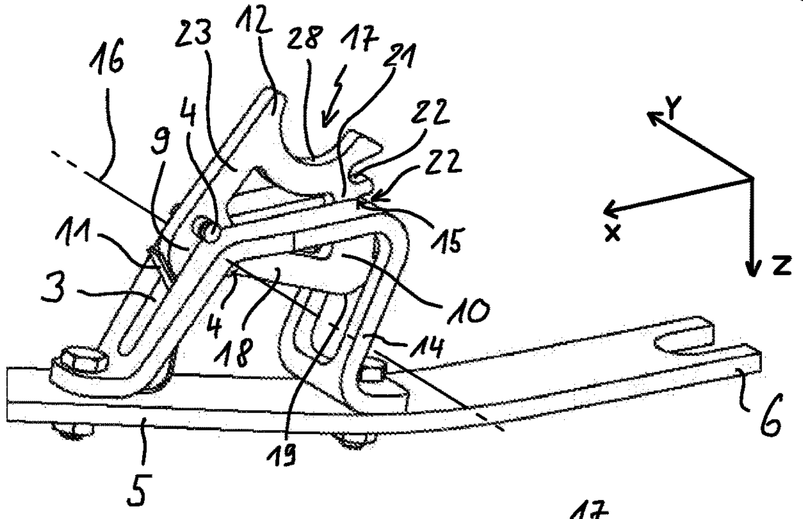
FIG. 5 shows a perspective view of a detail of the embodiment according to FIG. 1.

FIGS. 5 to 8 illustrate the embodiments shown in FIGS. 1 and 2 in more detail. FIG. 5 shows a detail of the ear lifter 1 to be screwed on under the finger guard 2 according to FIG. 2 in a perspective view of a part of the support rail 5 with the rear end 6 and the holder 14 for the finger guard 2, which is not shown, attached to the upper side of the support rail 5. The elongate recess 3 in the holder 14 is continuous and can also be referred to as a slotted hole 3. The locking lever 17 has a plurality of latching recesses 22, one of the latching recesses 22 cooperating with a latching portion 15 at an edge region of the elongate recess 3 to fix the locking lever 17 in one of its positions relative to the support rail 5. The spring 11 in the form of a leaf spring is connected to the support rail 5 and/or to the holder 14 and can extend through the elongate recess 3 in order to pretension the locking lever 17 against the latching portion 15 and thus hold it in position.

Figure 6:
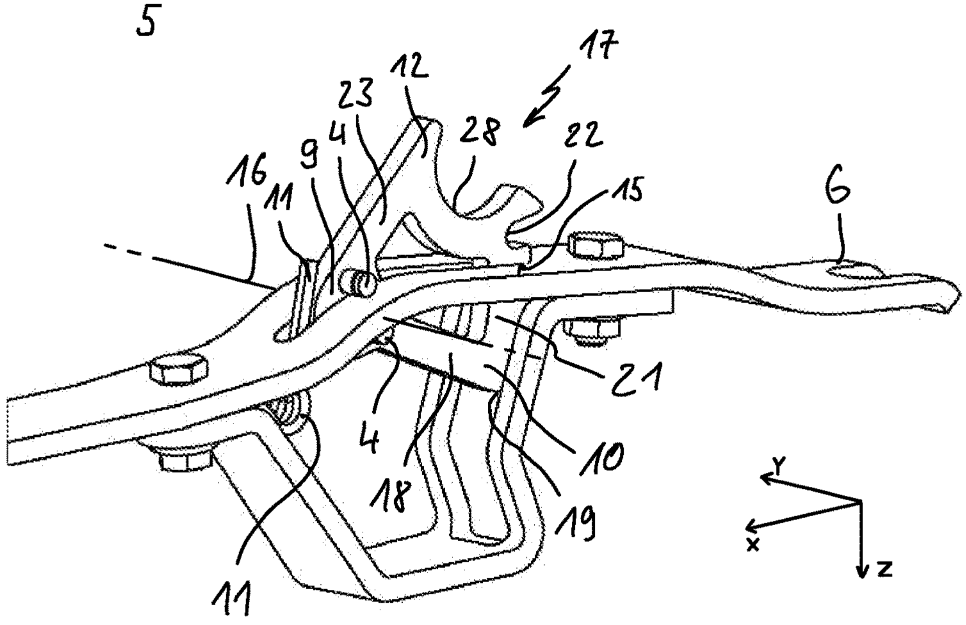
FIG. 6 shows a perspective view of a detail of the embodiment according to FIG. 2.

FIG. 6 shows a detail of the ear lifter 1 to be screwed on above the finger guard 2 according to FIG. 1 in a perspective view of a part of the support rail 5 with the rear end 6 and the holder 14 for the finger guard 2, which is not shown, attached to the underside of the support rail 5. The elongate recess 3 in the support rail 5 is continuous. One of the latching recesses 22 on the locking lever 17 interacts with the latching portion 15 on an edge region of the elongate recess 3 to fix the locking lever 17. In this embodiment, the edge region of the elongate recess 3 is formed on the support rail 5. The spring 11 in the form of a spiral spring is connected to the support rail 5 and can extend through the elongate recess 3 in order to pretension the locking lever 17 against the latching portion 15 and thus hold it in position. The shapes of the spring 11 shown in FIGS. 5 and 6 are not assigned to the embodiments and can be exchanged or designed in a different way.

Figure 7:
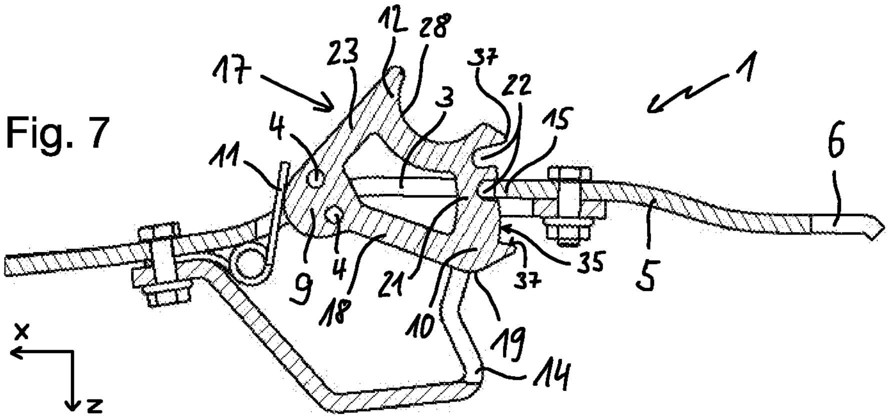
FIG. 7 shows a detail of the embodiment according to FIG. 2 in a sectional view.
Figure 8:
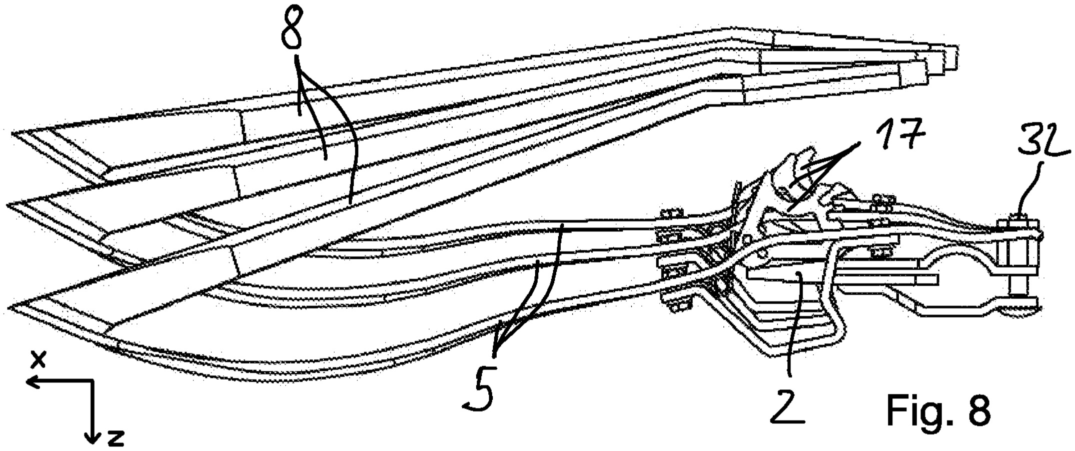
FIG. 8 shows an illustration of the mower according to FIG. 3 with a plurality of ear lifters in different positions.

In the following, the embodiments according to FIGS. 5 and 6 are additionally described together with reference to FIGS. 7 and 8, since the features of the locking lever 17 are identical in both embodiments. FIG. 7 shows the embodiment according to FIG. 6 in a longitudinal section in the plane spanned by the X-direction and the Z-direction through the ear lifter 1. The locking lever 17 could also be arranged in the elongate recess 3 of the embodiment shown in FIG. 5. In the illustration, the latching recess 22 of the locking lever 17 engages with that latching portion 15 on the holder 14 or on the support rail 5, which is arranged closer to the support surface 19. It can be seen that the distance between the support rail 5 and the finger guard 2 in both embodiments depends on which one of the latching recesses 22 receives the latching portion 15. The latching portion 15 is formed by the rear edge region of the elongate recess 3, wherein the rear edge is to be understood as the end of the elongate recess 3 facing the first end 6, irrespective of whether this is formed on the holder 14 or on the support rail 5. The locking lever 17 is pretensioned by the tension spring 11 in the direction of the latching portion 15 and is thus held in the respective position. This allows the height of the ear lifter to be adjusted in relation to the mower, as can be seen in FIG. 8.

In order to be able to alternately connect one of the latching recesses 22 with the latching portion 15, the locking lever 17 is pivotably arranged in the elongate recess 3. A resulting pivot axis 16, about which the locking lever 17 pivots, is not an axis formed by physical features, since the locking lever 17 is held in the slotted hole 3 by pins 4 in the depicted exemplary embodiment. The pins 4 extend transversely to the main direction of extension of the slotted hole 3 essentially in the Y direction and are arranged on both sides of the component with the slotted hole 3, i.e. the holder 14 or the support rail 5. This means that the locking lever 17 can be moved and pivoted along the slotted hole 3. The pivot axis 16 extends transversely to the plane spanned by the X-direction and the Z-direction, approximately in the Y-direction and approximately centrally between the two pins 4. The position of the pivot axis 16 is indicated in FIGS. 5 and 6; in FIG. 7 it extends approximately in the Y direction, perpendicular to the plane of the drawing, between the two pins 4. Since the locking lever 17 is seated with play in the elongate recess 3, the direction of the pivot axis 16 can vary slightly in relation to the Y direction. The pivot axis 16 is stationary relative to a connecting portion 9 of the locking lever 17, on which the pins 4 are arranged, and is accordingly moved along the slotted hole 3 with the locking lever 17.

The connecting portion 9, which holds the locking lever 17 pivotably about the pivot axis 16 in the elongate recess 3, is arranged along the elongate recess 3 or in the X-direction at an angle to a supporting portion 10 of the locking lever 17. In the illustrated exemplary embodiment, the connecting portion 9 is connected to the supporting portion 10 via a first leg 18. An edge of the supporting portion 10 facing the support rail 5 forms the support surface 19. The latching recesses 22 are also formed on the supporting portion 10, wherein the latching recesses 22 are arranged at different distances from the support surface 19. For this purpose, the supporting portion 10 has a second leg 21, which is angled in relation to the first leg 18 and on which the latching recesses 22 are arranged. The support surface 19 is arranged on a side of the supporting portion 10 facing the finger guard 2 (see FIGS. 3 and 4), while the second leg 21, or the latching recesses 22, are arranged on a side of the supporting portion 10 facing away from the support surface 19.

The locking lever 17 can have an actuating portion 12 for manual actuation, which has a concave shape 28 for ergonomically accommodating an operator's finger. The concave shape 28 can open towards the first end 6, allowing advantageous actuation with the thumb, while the other fingers of the operator's hand can reach under the support rail 5. This allows the locking lever 17 to be pulled against the force of the spring 11 in the direction of the second end 7 in order to release the latching recess 22 from the latching portion 15. With the operator's fingers gripping under the support rail 5, the support rail 5 can be adjusted to the desired height and the locking lever 17 can be fixed to the locking section 15 again, for example with another locking recess 22. The height can therefore be adjusted without tools and basically with just one hand. The actuating portion 12 is arranged on a side of the latching recesses 22 or the second leg 21 facing away from the support surface 19, so that the actuating portion 12 advantageously protrudes upwards out of the slotted hole 3. The actuating portion 12 can, for example, be connected to the second leg 21 and connected to the connecting portion 9 via a third leg 23, so that the locking lever 17 forms a stable, annularly closed shape. The two locking recesses 22 shown in the exemplary embodiment correspond to two different height settings of the support rail 5. In both height settings, the support rail 5 is deflected upwards. This results in a third height setting in which the locking rail 5 is not deflected. In this case, a surface 35 on the second leg 21 is in contact with the latching portion 15, as the locking lever 17 does not have to be fixed in position against the spring force of the support rail 5. The second leg 21 has stops 37 projecting at both ends in the direction of the first end 6, which interact with the upper or lower side of the support rail 5, or the holder 14, in the region of the latching portion 15 and thus limit a swivel range of the locking lever 17.

FIG. 8 shows a representation of the mower with a plurality of ear lifters 1 arranged one behind the other in the direction of view or Y-direction, or a plurality of the mower arrangements, here exemplarily with the ear lifters 1 in the embodiment according to FIG. 2. The three ear lifters 1 have three different height settings, in each of which the support rail 5 is set in a different position or at a different angle to the finger guard 2. Each of the height settings corresponds to one of the positions of the locking lever 17. With reference to FIGS. 3 and 4, it can be seen that the ear lifter 1 according to FIG. 4 is set higher in relation to the mower by reducing the distance between the support rail 5 and the finger guard 2, while the ear lifter 1 according to FIG. 3 is set higher in relation to the mower by increasing the distance between the support rail 5 and the finger guard 2.

Figure 9:
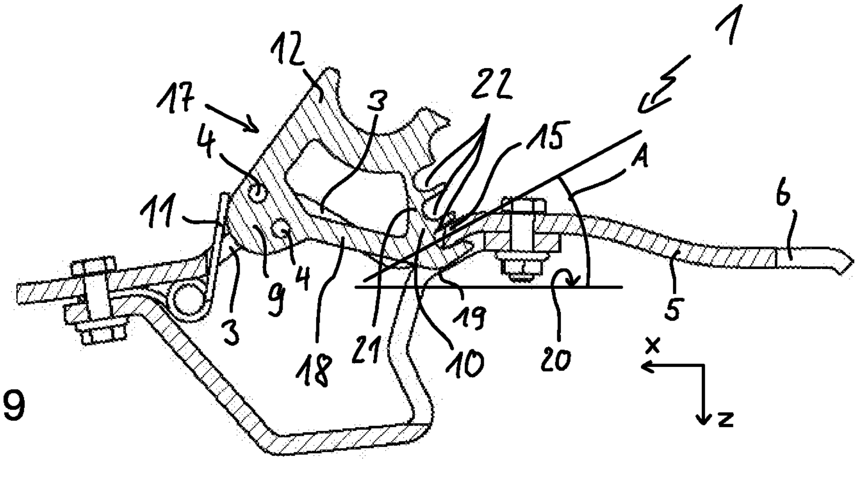
FIG. 9 shows a further embodiment of the ear lifter by means of a detail in a sectional view.

With reference to FIGS. 9 and 10, which are described together, a further embodiment of the ear lifter 1 is described. The embodiment is based on the basic embodiment shown in FIG. 2, but can also be transferred to the basic embodiment shown in FIG. 1 by transferring the features described below with regard to the elongate recess 3 and the support rail 5 to an elongate recess 3 on the holder 14. According to the embodiment, it is provided that the latching portion 15 encloses an acute angle A with the surface 20 of the finger guard 2, which is only indicated here. The surface 20 of the finger guard 2 is generally aligned approximately horizontally in the installation position on the mower, i.e. parallel to a plane spanned by the X-direction and the Y-direction. An advantage of the embodiment is that the spring force acting in the Z direction of the support rail 5 deflected in the opposite direction to the Z direction holds the locking lever 17 in its position. The latching portion 15 acts with a proportion of the spring force dependent on the angle A in the direction of the latching recess 22, which is supported on the surface 20 of the finger guard via the second leg 21 and the support surface 19. The angle A, for example, has an angular dimension of at least 10°, in particular from 20° to 30°. The openings of the latching recesses 22 on the second leg 21 of the supporting portion 10 are aligned with the latching portion 15. The angled shape of the latching portion 15 is achieved in the illustrated exemplary embodiment by the elongate recess 3 having an S-shaped or Z-shaped profile in the direction of its longitudinal extension. The spring 11 applies a spring force to the locking lever 17 in the area of the connecting portion 9 in the direction of the first end 6, thereby also holding it in position.

In this exemplary embodiment, the locking lever 17 also differs from the embodiments described above in that three locking recesses 22 are provided, which make it possible to fix the ear lifter 1 in three different height settings. The three latching recesses 22 can be realized in any of the embodiments described in this application.

With reference to FIGS. 11 and 12, a further embodiment of the mower or mower arrangement is described below. FIGS. 11 and 12 each show the mower or the mower arrangement consisting of the finger guard 2 and the ear lifter 1, which is only partially shown. The ear lifter 1 and the finger guard 2 are attached to the cutter bar, which is not shown, by fastening means 32. The embodiment shown refers to the basic embodiment shown in FIG. 2. However, the features relating to the locking lever 17 can also be transferred to the basic embodiment shown in FIG. 1. In the exemplary embodiment shown, the locking lever 17 has an actuating hook 29 for actuation by the finger guard 2, wherein the actuating hook 29 is designed to embrace a tip 30 of the finger guard 2 in such a way that the locking lever 17 is displaced into one of the positions and engages when the distance between the finger guard 2 and the support rail 5 is changed. In FIG. 11, the ear lifter 1 is set to its lowest position. For this lowest setting position, the locking lever 17 does not necessarily have to be fixed in one position, as the force of the support rail 5 acting in the Z direction does not act on the finger guard 2 via the locking lever 17 and the locking lever 17 has no function as a spacer between the ear lifter 1 and the finger guard 5. The surface 35 of the supporting portion 10 rests against the latching portion 15 at the rear edge of the elongate recess 3. The latching recesses 22 are arranged adjacent to the surface 35 on the side opposite the support surface 19. The actuating hook 29 is arranged on the connecting portion 9 of the locking lever 17 and is shaped so that it engages around the finger guard tip 30 in the height setting shown in FIG. 11. As a result, the ear lifter 1 can be advantageously moved to one of the positions without manual actuation of the locking lever 17. When the support rail 5 is deflected upwards, i.e. against the Z direction, the distance between the support rail 5 and the surface 20 of the finger guard 2 is increased. The locking lever 17 is pivoted clockwise by the actuating hook 29 engaging under the finger guard tip 30. Due to the shape of the actuating hook 29 and the displaceability of the locking lever 17 along the elongate recess 3, the actuating hook 29 slips off the finger guard tip 30 under continued deflection of the support rail 5, as shown in FIG. 12. The locking lever 17 was previously pivoted clockwise until one of the latching recesses 22 reaches the latching portion 15 and the force of the spring 11 causes the locking lever 17 to engage in one of the positions. Depending on the shape of the actuating hook 29, it can engage in the upper or lower latching recess 22.

Figure 13:
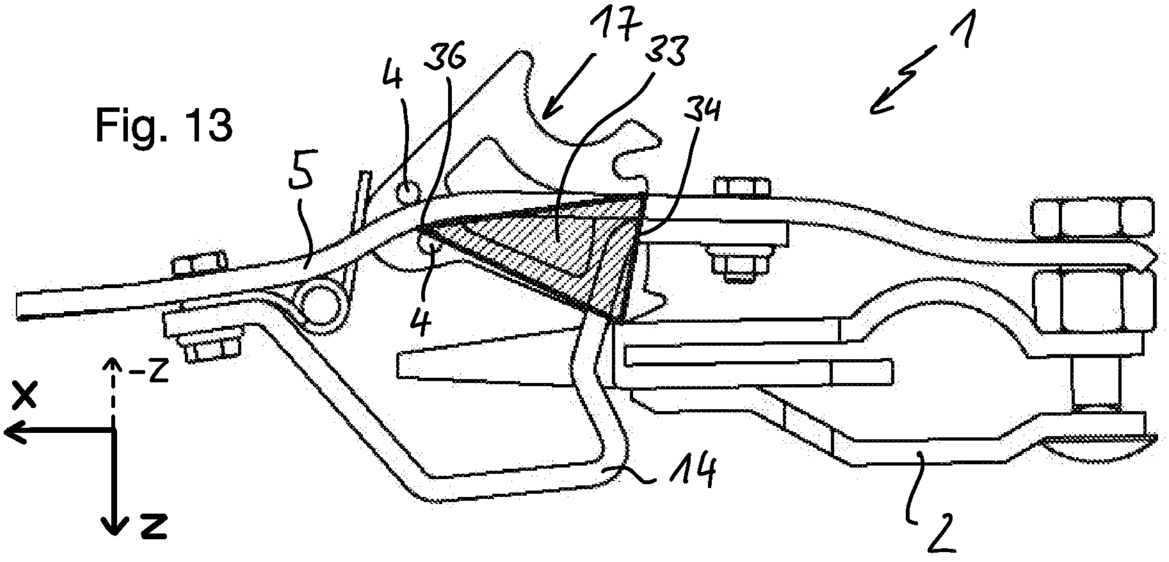
FIG. 13 shows a detail of the embodiment of the ear lifter according to FIG. 2 in a side view.

FIG. 13 shows a detail of the embodiment of the ear lifter 1 according to FIG. 2 in a side view. A further advantage of the embodiment, which also applies to other embodiments, is explained with reference to FIG. 13. The locking lever 17 has a stiffening effect with respect to a bending stress on the support rail 5 in the region of the elongate recess 3, the stiffening effect of the locking lever 17 being greater in a first bending direction in the Z direction than in a second bending direction opposite to the first bending direction, which is designated −Z. The support rail 5 is regularly subjected to bending during operation. Due to uneven ground or stones protruding from the ground, the support rail 5 is often deflected upwards, i.e. in the second bending direction −Z, which is why the support rail 5 must be designed to be correspondingly elastic in order to avoid any resulting damage. If the second end 7 of the support rail 5 penetrates the ground, a downward deflection in the first bending direction Z can also occur. This is undesirable as the ear lifter 1 can dig into the soil and be destroyed. Broken off parts of the destroyed ear lifter can in turn cause considerable further damage to the harvester. For this reason, it is advantageous if the support rail 5 is stiffer in the first bending direction Z than in the second bending direction −Z. Such a stiffening effect of the locking lever 17 is given here and it is illustrated by a triangle 33 drawn for explanation purposes. A base 34 of the triangle 33 corresponds to the distance defined by the locking lever 17 between the surface 20 of the finger guard 2 and the support rail 5, or more precisely the latching portion 15. A tip 36 of the triangle 33 indicates the point of the fastening section 9 in which the support rail 5 is held between the pins 4 and which is connected to the base 34 via the first leg 18. The section of the support rail 5 located between the tip 36 and the base 34 cannot be deflected downwards in the first bending direction Z, but can be deflected in the opposite second bending direction −Z.

Figure 14:
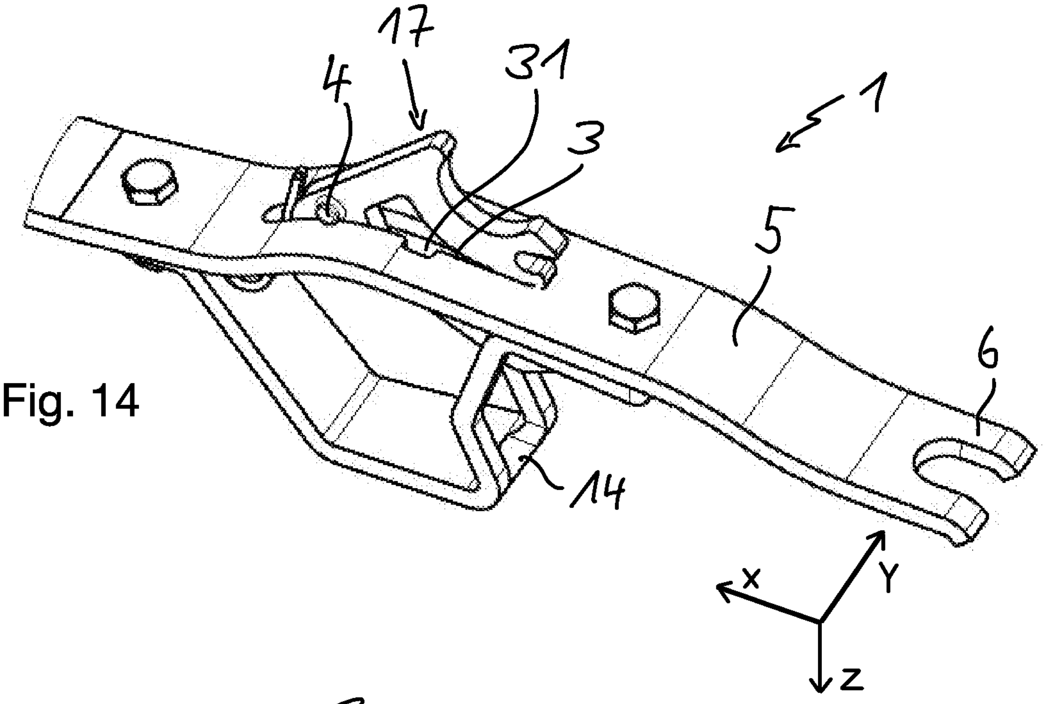
FIG. 14 shows a further embodiment of the ear lifter by means of a detail in a perspective view.
Figure 15:
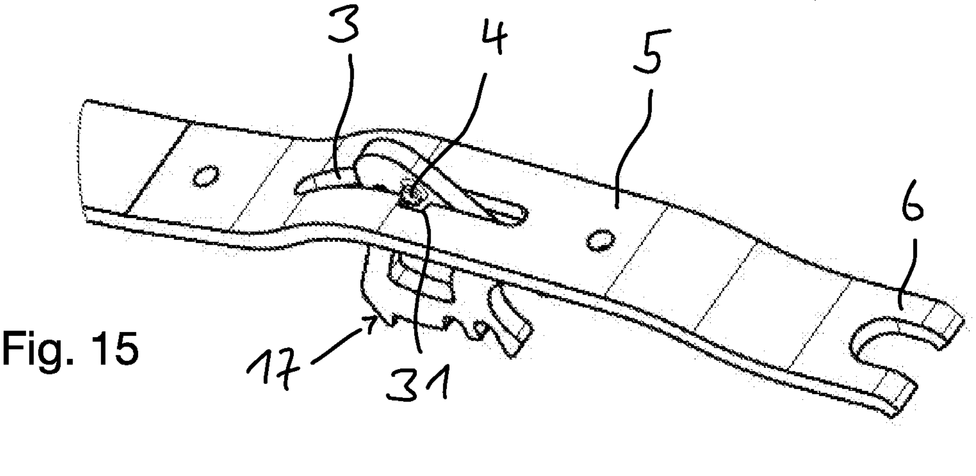
FIG. 15 shows a perspective view of the assembly of the embodiment according to FIG. 14.

With reference to FIGS. 14 and 15, further embodiments of the ear lifter 1 are described. FIG. 14 shows a further embodiment of the ear lifter 1 by means of a detail in a perspective view. The embodiment shown corresponds to the basic embodiment shown in FIG. 2. The features of this embodiment relating to the elongate recess 3 and the locking lever 17 can also be transferred to the basic embodiment shown in FIG. 1. The locking lever 17, which is designed as a plate, has the two pins 4 which protrude from at least one surface of the plate in order to hold the locking lever 17 pivotably and displaceably in the elongate recess 3. The pins 4 can protrude from the surfaces of the plate on both sides of the locking lever in the Y direction, or only from one of the surfaces. At least one of the pins 4 can be designed as a pin that is seated in a hole in the locking lever 17. An advantage is that the at least one pin can be inserted into the locking lever 17 after the locking lever 17 is positioned in the elongate recess 3. The locking lever 17 is then positively connected to the support rail 5 or the holder 14 in all spatial directions.

In the embodiment shown, at least one of the pins 4 is formed in one piece with the locking lever 17, which can be achieved, for example, by producing the pin 4 by cup drawing or as a notch by a forming process. The production of the pin 4 can advantageously take place simultaneously with the production of the locking lever 17, which considerably simplifies the production of the locking lever 17. The other pin 4 can be designed as a pin that can be subsequently inserted into the locking lever 17. Production is further simplified if both pins 4 are formed in one piece with the locking lever 17, as shown in the illustrated embodiment. In this case, the elongate recess 3 is provided with an expansion 31 extending transversely to the longitudinal extent of the elongate recess 3, which can also be referred to as a notch or widening of the elongate recess 3.

FIG. 15 shows a perspective view of the assembly of this embodiment, in which the locking lever 17 is inserted into the elongate recess 3 in such a way that the pin 4 is inserted through the expansion 31. FIG. 14 shows that, when the ear lifter 1 is mounted, the pin 4 cannot reach the expansion 31 arranged approximately in the middle of the elongate recess 3 and therefore cannot be lost during operation. Even on the single ear lifter 1 in an unmounted state, the locking lever 17 is securely connected to the ear lifter 1 as long as one of the latching recesses 22 is connected to the latching portion 15 and the spring 11 applies a force to the locking lever 17 in the direction of the first end 6.

Further embodiments of the ear lifter 1 and the mower or the mower arrangement are described with reference to FIGS. 16 to 18. FIG. 16 shows a further embodiment of the ear lifter 1 by means of a detail in a side view. FIG. 17 shows a perspective view of the embodiment shown in FIG. 16. FIG. 18 shows a side view of a further embodiment of the mower or the mower arrangement with the ear lifter 1 as shown in FIG. 16. FIGS. 16 to 18 are described together below. The embodiment is described on the basis of the basic embodiment according to FIG. 2, wherein distinguishing features of the elongate recess 3 and the locking lever 17 can be transferred to the basic embodiment according to FIG. 1. The locking lever 17 has a connecting recess 24, which is intended to receive a connecting edge region 25 of the elongate recess 3. The connecting recess 24 is formed on the connecting portion 9. The connecting edge region 25 is arranged at a front end of the elongate recess 3 opposite the latching portion 15. The connecting edge region 25 accommodated in the connecting recess 24 provides a positive connection in the Z direction between the support rail 5, or the holder 14, and the locking lever 17. The pins 4 of the previously described embodiments can thus be advantageously omitted, which further simplifies the manufacture of the locking lever 17. In the perspective view of FIG. 17, it can be seen that the elongate recess 3 has a correspondingly smaller extension in its main direction of extension. The connecting recess 24 is delimited by webs 26, the end sections 27 of which accommodate the connecting edge region 25 between them or rest against the connecting edge region 25. In the exemplary embodiment, the tension spring 11 does not extend through the elongate recess 3, but acts on one of the end sections 27 on one of the webs 26. In the embodiment shown, the locking lever 17 can also be moved along the elongate recess 3 so that the latching recesses 22 can engage the latching portion 15 and be released again. The pivot axis 16, which results from the pivotability of the locking lever 17, extends approximately parallel to the Y direction between the end sections 27.

Figure 19:
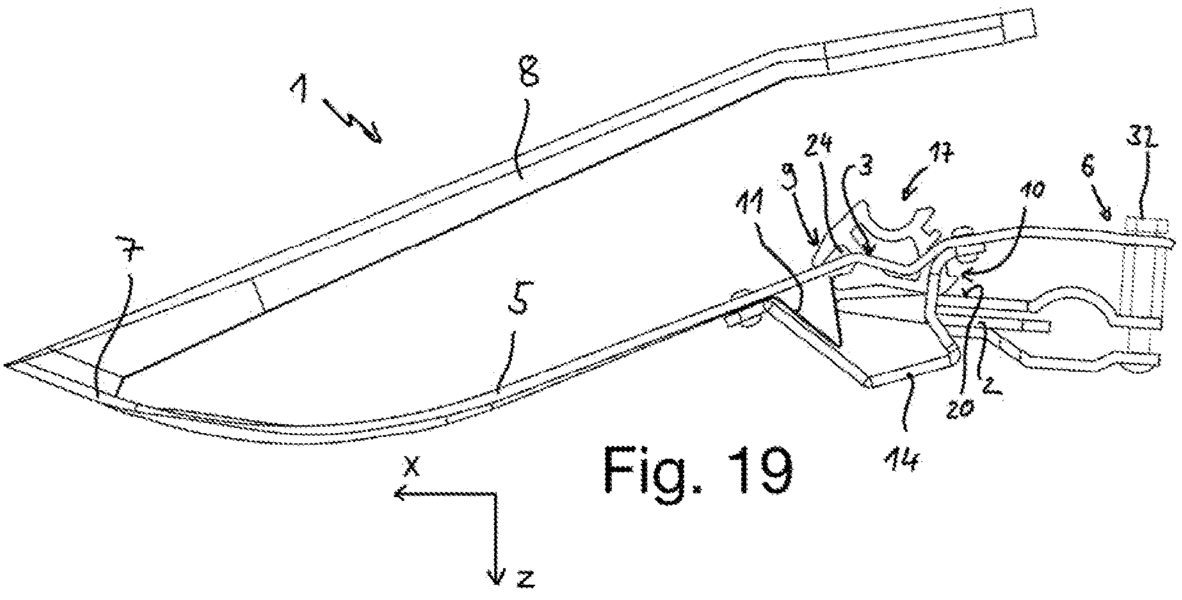
FIG. 19 shows a side view of another embodiment of the ear lifter on the mower.
Figure 20:
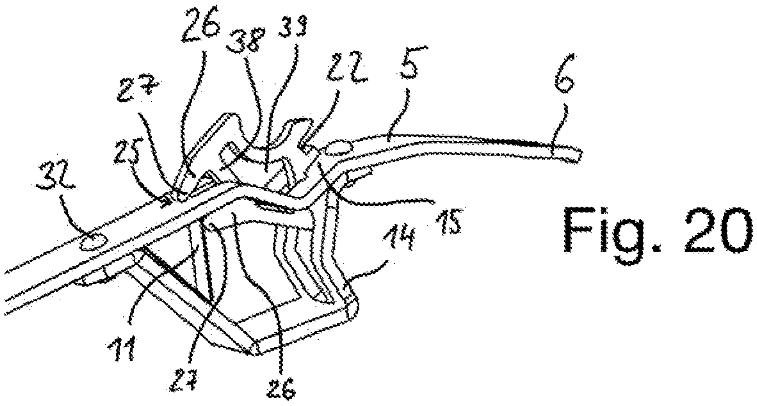
FIG. 20 shows a perspective view of a detail of the embodiment according to FIG. 19.
Figure 21:
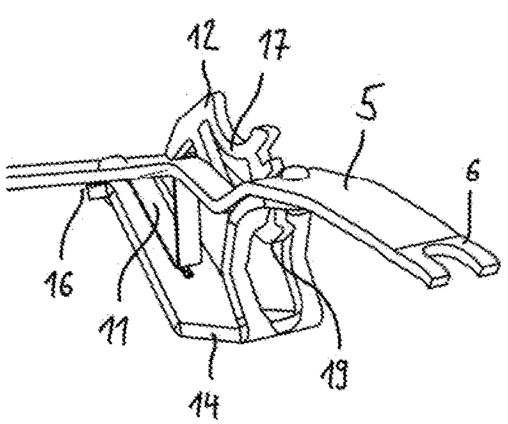
FIG. 21 shows the detail of the embodiment according to FIG. 19 in a further perspective view.

Further embodiments of the ear lifter 1 and the mower or the mower arrangement are described with reference to FIGS. 19 to 21. FIG. 19 shows a side view of a further embodiment of the mower with the ear lifter 1. FIG. 20 shows a perspective view of the embodiment shown in FIG. 19. FIG. 21 shows the embodiment from FIG. 19 in a further perspective view. FIGS. 19 to 21 are described together below. The embodiment is described on the basis of the basic embodiment according to FIG. 2, wherein distinguishing features of the elongate recess 3 and the locking lever 17 can be transferred to the basic embodiment according to FIG. 1. The locking lever 17 comprises the connecting recess 24, which is intended to receive a connecting edge region 25 of the elongate recess 3. The connecting recess 24 is formed on the connecting portion 9. The connecting edge region 25 is arranged at a front end of the elongate recess 3 opposite the latching portion 15. The connecting edge region 25 accommodated in the connecting recess 24 provides a positive connection in the Z direction between the support rail 5, or the holder 14, and the locking lever 17. The connecting recess 24 is delimited by webs 26, the end sections 27 of which accommodate the connecting edge region 25 between them or rest against the connecting edge region 25. The smaller connecting recess 24 compared to the embodiment according to FIGS. 16 to 18 is delimited by a connecting web 38 opposite of the opening. A recess 39 extending through the locking lever 17 in the Y-direction is provided between the connecting web 38 and the supporting portion 10, which saves mass and material of the locking lever 17.

In the exemplary embodiment, the tension spring 11 does not extend through the elongate recess 3. The tension spring 11, a leaf spring which is fastened together with the holder 14 for the finger guard, is approximately V-shaped, with one leg being arranged on the support rail 5 by the fastening means 32 and a second leg acting on one of the end sections 27 on one of the webs 26. In the embodiment shown, the locking lever 17 as well can be moved along the elongate recess 3 so that the latching recesses 22 can engage the latching portion 15 and be released again. The pivot axis 16, which results from the pivotability of the locking lever 17, extends approximately parallel to the Y direction between the end sections 27.

According to the embodiment, it is provided that the latching portion 15 forms an acute angle A with the surface 20 of the finger guard 2, as shown in the embodiment according to FIG. 9. The surface 20 of the finger guard 2 is generally aligned approximately horizontally in the installation position on the mower, i.e. parallel to a plane spanned by the X-direction and the Y-direction. An advantage of the embodiment is that the spring force acting in the Z direction of the support rail 5 deflected in the opposite direction to the Z direction holds the locking lever 17 in its position. The latching portion 15 acts with a proportion of the spring force dependent on the angle A in the direction of the latching recess 22, which is supported on the surface 20 of the finger guard 2 via the support surface 19. The angle A, for example, has an angular dimension of at least 10°, in particular from 20° to 30°. The openings of the latching recesses 22 of the supporting portion 10 are aligned with the latching portion 15. The angled shape of the latching portion 15 is achieved in the illustrated exemplary embodiment by the elongate recess 3 having an S-shaped or Z-shaped profile in the direction of its longitudinal extension. The tension spring 11 applies a spring force to the locking lever 17 in the area of the connecting portion 9 in the direction of the first end 6, thereby also holding it in position.

REFERENCE NUMERALS

1 Ear lifter
2 Finger guard
3 Elongate recess
4 Pin
5 Support rail
6 First end
7 Second end
8 Stalk lifter
9 Connecting portion
10 Supporting portion
11 Spring
12 Actuating portion
14 Holder for the finger guard
15 Latching portion
16 Pivot axis
17 Locking lever
18 First leg
19 Support surface
20 Side of the finger guard facing the support rail
21 Second leg
22 Latching recesses
23 Third leg
24 Connecting recess
25 Connecting edge region
26 Webs
27 End portions
28 Concave shape
29 Actuating hook
30 Tip of the finger guard
31 Expansion
32 Fasteners
33 Triangle
34 Base
35 Surface
36 Tip
37 Stop
38 Connecting web
39 Recess
A Angle
X, Y, Z Spatial directions

The invention claimed is:

1. An ear lifter for a mower of a harvesting machine with finger guards which are attached to a cutter bar, the ear lifter comprising:

a support rail with a first end for fastening to the cutter bar; and a stalk lifter connected to a second end of the support rail and a locking lever, wherein the locking lever has a support surface for support on one of the finger guards and fixable in at least two positions relative to the support rail in order to set a distance between the finger guard and the support rail, wherein an elongate recess is provided on the ear lifter and the locking lever is guided displaceably in the elongate recess, and wherein the locking lever is arranged pivotably in the elongate recess, a resulting pivot axis extending transversely to a longitudinal extent of the elongate recess and being displaceable in a direction of the longitudinal extent of the elongate recess.

2. The ear lifter according to claim 1, wherein the locking lever has a connecting recess, the connecting recess being provided to receive a connecting edge region of the elongate recess at an end of the elongate recess opposite the latching portion.

3. The ear lifter according to claim 2, wherein the connecting recess is delimited by webs, the end portions of which receive the connecting edge region between them.

4. The ear lifter according to claim 3, wherein the elongated recess is arranged in the support rail or in that the elongated recess is arranged in a holder for the finger guard arranged on the support rail.

5. The ear lifter according to claim 3, wherein the locking lever has latching recesses, one of the latching recesses in each position interacting with a latching portion on an edge region of the elongate recess in order to fix the locking lever in the respective position.

6. The ear lifter according to claim 5, wherein the locking lever has a connecting portion and a supporting portion arranged side by side in the elongate recess, the locking lever being held at the connecting portion pivotably about the pivot axis in the elongate recess, and the support surface and the latching recesses being formed on the supporting portion.

7. The ear lifter according to claim 6, wherein the support surface is arranged on a side of the supporting portion facing the finger guard and the latching recesses are arranged on a side of the supporting portion facing away from the support surface.

8. The ear lifter according to claim 3, wherein the locking lever is designed as a plate, wherein two pins protrude from at least one surface of the plate in order to hold the locking lever pivotably and displaceably in the elongate recess.

9. The ear lifter according to claim 5, wherein the latching portion forms an acute angle (A) with a surface of the finger guard cooperating with the locking lever in an installed position.

10. The ear lifter according to claim 3, wherein the locking lever has an actuating portion for manual actuation, wherein a concave shape for receiving a finger of an operator is formed on the actuating portion.

11. The ear lifter according to claim 3, wherein the locking lever has an actuating hook for actuation by the finger guard, the actuating hook being designed to embrace a tip of the finger guard in such a way that the locking lever is displaced into one of the positions when a distance between the finger guard and the support rail is changed.

12. The ear lifter according to claim 3, wherein the locking lever has a stiffening effect with respect to a bending stress on the support rail in a region of the elongate recess, a stiffening effect of the locking lever being greater in a first bending direction (Z) than in a second bending direction (−Z) opposite to the first bending direction.

13. The ear lifter according to claim 5, wherein the locking lever is pretensioned by a spring in the direction of the latching portion.

14. The ear lifter according to claim 3, wherein the support surface is intended to be in contact with a side of the finger guard facing the support rail.

* * * * *